United States Patent [19]

Fields

[11] Patent Number: 4,481,412
[45] Date of Patent: Nov. 6, 1984

[54] INTERACTIVE VIDEODISC TRAINING SYSTEM WITH BAR CODE ACCESS

[76] Inventor: Craig I. Fields, 2737 Devonshire Pl., Washington, D.C. 20008

[21] Appl. No.: 473,022

[22] Filed: Mar. 7, 1983

Related U.S. Application Data

[63] Continuation-in-part of Ser. No. 390,403, Jun. 21, 1982, abandoned, which is a continuation-in-part of Ser. No. 341,456, Jan. 21, 1982, abandoned.

[51] Int. Cl.³ ............................................. G06K 7/10
[52] U.S. Cl. .................................... 235/472; 235/419; 235/462; 235/383; 235/385
[58] Field of Search ............... 235/383, 385, 419, 472, 235/495, 462

[56] References Cited

U.S. PATENT DOCUMENTS

| | | | |
|---|---|---|---|
| 3,716,697 | 2/1973 | Weir | 235/383 |
| 3,757,037 | 9/1973 | Bialek | 235/472 X |
| 4,180,304 | 12/1979 | Koenig | 235/385 |
| 4,195,773 | 5/1980 | Ogden | 235/495 |

*Primary Examiner*—Harold I. Pitts
*Attorney, Agent, or Firm*—W. Edward Johansen

[57] ABSTRACT

The present invention is an interactive video training system with bar code access for use in combination with a videodisc on which training material is stored and a workbook having a printed index of the training material. A unique bar code is associated with each unique item in the printed index. The training system includes a bar code reading device for reading each unique bar code and a videodisc player for playing the training material which is stored on the videodisc. The videodisc player has a first microprocessor for receiving mode inputs and address inputs and a driving mechanism for rotatively driving the videodisc. The training system also includes a second microprocessor which is electrically coupled to the bar code reading device. The second microprocessor receives an input signal from the bar code reading device and processes the input signal in order to generate a set of output signals, which are the mode inputs and the address inputs. The first microprocessor, which is electrically coupled to the second microprocessor, controls the driving mechanism as the driving mechanism rotatively drives the videodisc to positions where the particular set of items are stored on the videodisc in order to access the unique set of items stored within the videodisc which corresponds to a particular associated bar code and retrieve the particular set of items in a particular sequence or pace.

4 Claims, 3 Drawing Figures

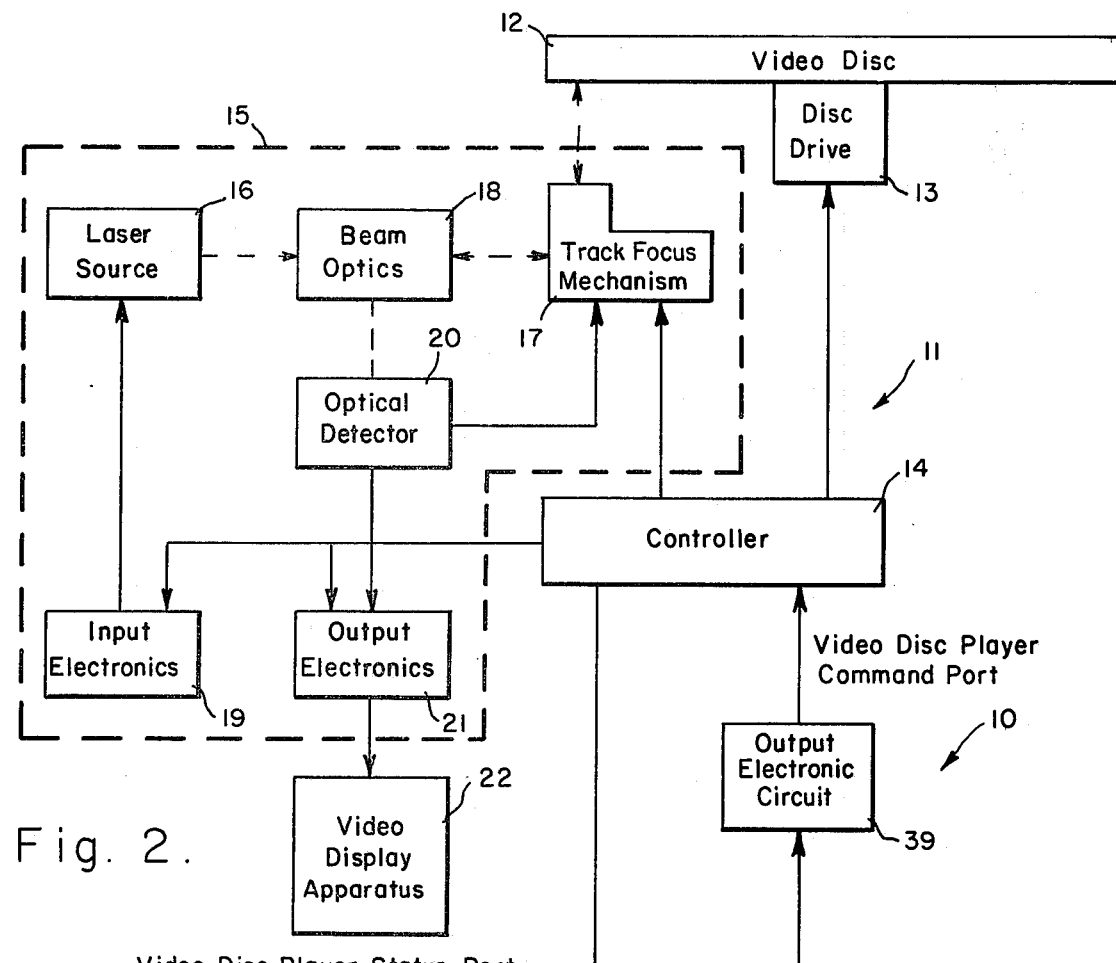
Fig. 2.
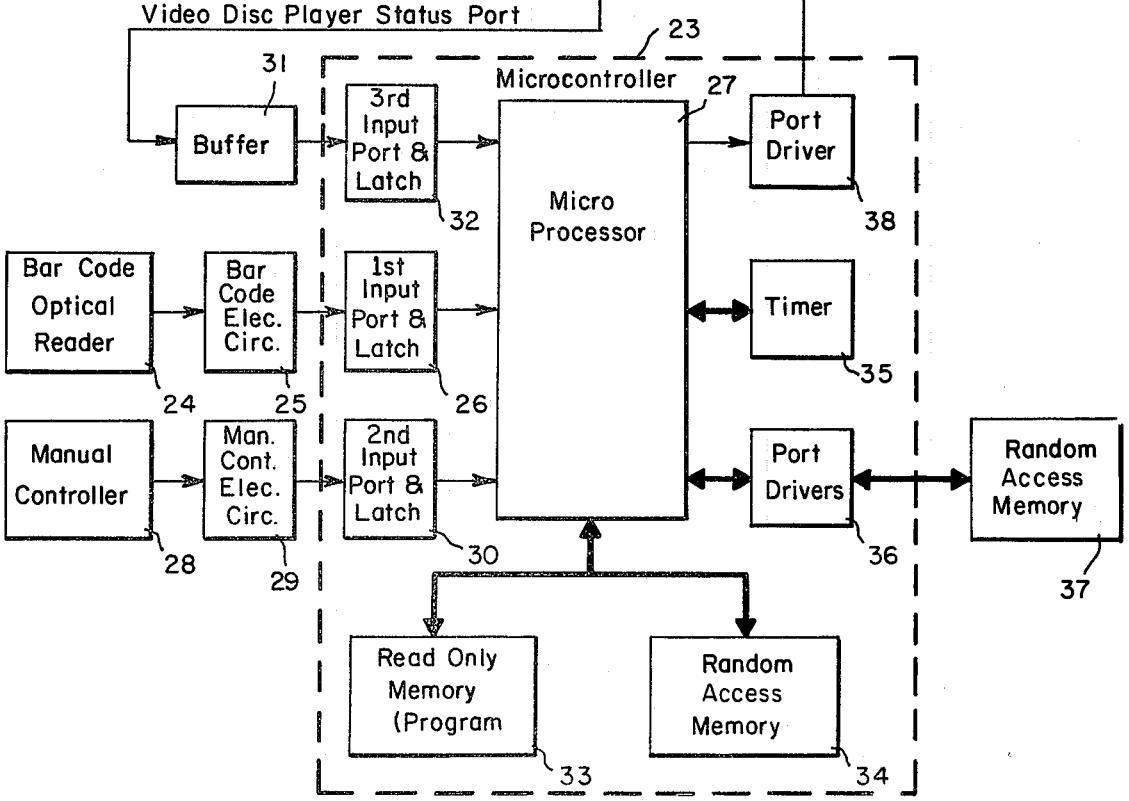

Fig. 3.

SIDE A
LESSON 1: MANAGING CRITICALLY INJURED PATIENTS

SCENE OF THE ACCIDENT — 43

MOTION (57 seconds) — 44

Survival of the critically injured patient depends upon fast, effective evaluation and treatment. The process begins at the scene of the accident. Paramedic personnel are trained to assess a patient's vital signs, and to carry out the first steps of resuscitation. When stabilized, the patient is transported to the emergency room. Paramedics transfer information to the emergency care physician concerning (1) the nature of the accident, (2) observed level of consciousness, (3) vital signs, and (4) any therapy administered in the field.

Paramedics
• check vital signs
• resuscitate
• transport to emergency room
• transfer information to physician

— 47

REVIEW — 46

At the scene of an accident, the paramedics' first step should be to: (Choose one) — 48

A. Administer blood volume expanders .......... 48a
B. Transport to the emergency room .......... 48b
C. Check vital signs ..........

— 49
— 49a
— 49b

NOTES

---

SIDE A
LESSON 1: MANAGING CRITICALLY INJURED PATIENTS

EVALUATION AND MANAGEMENT ROUTINES

— 54

CHOICE — 51

Management procedures for critically injured patients include: (Choose any or all of these routines for review.)

Detection of gastric or esophageal bleeding by use of a nasogastric tube

Detailed chest wall examination to detect: — 52
• chest wall injury
• hemothorax
• pneumothorax
• large vessel injury A rapid fracture examination to detect extremity injuries Intravenous line established in patients with severe trauma Continuous monitoring of cardiopulmonary status, including:
• vital signs
• arterial blood gas
• EKG Diagnosis of blunt trauma to intra-abdominal organs — difficult if patient is unresponsive Screening for intraperitoneal injury through a peritoneal lavage Renal function monitoring by placement of a Foley catheter Neurological examination whenever the patient is poorly responsive or has a history of head or spinal column trauma

— 53

INTERACTIVE VIDEODISC TRAINING SYSTEM WITH BAR CODE ACCESS

REFERENCE TO RELATED APPLICATION

This is a continuation-in-part of a continuation-in-part, filed June 21, 1982, having Ser. No. 390,403, of the application, filed Jan. 21, 1982, having Ser. No. 341,456.

BACKGROUND OF THE INVENTION

1. Field of the Invention

The present invention relates to an interactive videodisc training system with bar code access for use in combination with a workbook having a printed index of training material which is stored on a videodisc and more particularly to a bar code reading device which a microprocessor electrically couples to the controller of a videodisc player.

2. Description of the Prior Art

There are presently a number of training systems which depend on automatic and semi-automatic storage and retrievel of information. These systems are widely used in industry, government, universities and schools, and are being increasingly used in the home. These systems share common problems in that access to the information is not straightforward, but must be accomplished through a unique indexing and accessing means. These systems also have indexes to stored information which are often comparable in volume to the stored information. As a result, the indexing and accessing means are often difficult to learn to use and hard to use following learning, typically involving sequential data entry procedures with keyboards and keypads which are time consumming and prone to error.

The videodisc is a particularly advantageous medium for information storage and retrieval. At present, each side of a standard videodisc can store up to 54,000 individual video frames. Each frame can contain a standard television picture, a combination of television picture and digital data or digital data alone. Through the use of a videodisc player frames on the videodisc can be accessed rapidly and displayed individually or sequentially (to produce motion sequences) on a standard video display apparatus, i.e. a television receiver or monitor. The videodiscs themselves are compact, inexpensive to replicate and relatively indestructable compared to other high-density, quick-access storage media.

Kent D. Broadbent, in his article, entitled "A Review of the MCA Disco-Vision System," published in the *Journal of the Society of Motion Picture and Television Engineers* in the July 1974 issue, in Volume 83, pages 554–559, discusses frame number encoding of the information on a videodisc. Within each vertical interval a digitally coded digital word is placed and contains pseudorandom sync signals, parity check, a five decimal digit frame number and a field identification. The parity check and the pseudorandom sync signals are used to ensure that only valid data are used. A five digit display presents the number of the frame being viewed. When the search mode is initiated, logic compares the present frame number with the desired frame number. The leadscrew servo initiates a fast scan of the coded digital data until it passes the desired frame number at which time the videodisc player resumes normal real-time play until the desired frame is reached.

Mike Edelhart, in his article, entitled "Optical Discs: The Omnibus Medium," published in Technology in Volume 1 in the November-December, 1981 issue, on pages 42–57, discusses the use of a videodisc player in combination with a microprocessor to control access to each frame on a video disc.

Albert A. Jamberdino, in his article, entitled "High-Capacity High-Speed Recording," published in *Optical Engineering* in Volume 20, Number 3, in the May/June, 1981 issue, on pages 387–393, discusses a videodisc player including a disc drive and a controller into which a microprocessor is able to send a set of mode signals and address signals.

U.S. Pat. No. 4,297,009, entitled Image Storage and Display, issued to Reuban S. Mezrich, Alec Colleoni and David J. Lyons on Oct. 27, 1981, teaches a videodisc system which includes a video disc with images and their respectively associatedly timing marks which are arrayed as phototransparencies on the videodisc. When the disc drive videodisc player rotates the videodisc a sensing device senses the timing marks. The sensing device is electrically coupled to the controller of the videodisc player.

U.S. Pat. No. 4,279,004, entitled Method for Controlling Rotary Memory Device, issued to Yoshiaki Yamashita, Hiroyuki Kambara, Hiroaki Kambayashi and Yasuyuki Okada on July 14, 1981, teaches a method for controlling a rotary memory apparatus for storing at least one record including at least an address section identifying the record and a data section forming the data of the record.

U.S. Pat. No. 4,321,635 entitled Apparatus for Selective Retrieval of Information Streams or Items, issued to Hiroshi Tsuyuguchi on Mar. 23, 1982, teaches an apparatus for selectively retrieving a plurality of recorded information streams or items which includes an index listing the starting addresses of the information streams or items.

U.S. Pat. No. 4,245,247, entitled Hard Copy Reproduction from Video Disc Information, issued to Bruce G. Fike and Evan A. Edwards on Jan. 13, 1981, teaches a device for producing a print of information stored on a videodisc.

U.S. Pat. No. 4,199,820, entitled Random Access Storage Apparatus with a Movable Recording Medium, issued to Masatahi Ohtake, Takeshi Maeda and Morishi Izumita on Apr. 22, 1980, teaches a random access storage apparatus for use in a storage apparatus wherein signals are recorded on tracks which have addresses assigned in advance on a rotary recording medium such as an optical videodisc and which are randomly searched at high speed.

U.S. Pat. No. 4,138,663, entitled Optical Reader for Information Discs Equipped with Means for Automatic Access to Information, issued to Jean Claude Lehureau and Pierre Ograsdi on Feb. 6, 1979, teaches an optical reader for information discs on which the items of information are locatable by addresses previously recorded on each of the grooves forming a track for counting the number of grooves traversed forming the track. The optical reader includes a device for counting the number of grooves traversed during search phases which simultaneously uses the envelope of the reading signal and the signal representing the radial error in the position of the head relative to the nearest track for algebraically counting the number of tracks traversed. After comparison with the number of grooves to be traversed, the counting device controls the deceleration of the radial advance when the spot is at a predetermined distance from the groove to be reached and also its stop page and the closure of the radial servo control loop when the groove is reached.

U.S. Pat. No. 4,315,322, entitled Microimage Registration System for Loading and/or Updating Microfiches in Microfilm Cassette Library, issued to Mikio Osaki, Hiroshi Kamada, Kohichi Kakimoto and Toshiaki Tabushi on Feb. 9, 1982, teaches a microimage registration system which loads and/or which updates microfiches in a microfilm cassette library.

U.S. Pat. No. 4,094,079, entitled Single Medium Audio-Visual Teaching Machine, issued to Loyd G. Dorsett on June 13, 1978, teaches an audio-visual teaching machine which includes a source record playback unit which provides a composite source output signal which corresponds to a source record which has audio, video control and source control portions. The audio-visual teaching machine also includes a video control unit which stores the video control signal of the composite source output signal and provides a composite video signal which corresponds to the stored video control portion for application to a video display unit. The audio-visual teaching machine further includes a source control unit which is responsive to the source control portion of the composite source output signal and which controls the operation of the video control unit, a source record playback unit and circuitry which applies the audio portion of the composite source output signal to an audio output unit.

U.S. Pat. No. 4,333,152, entitled TV Movies That Talk Back, issued to Robert M. Best on June 1, 1982, teaches a video system which presents a branching sound movie with which a human viewer interacts and which includes a video image generator which generates the picture elements of a first animated cartoon picture which is linked to a plurality of second animated cartoon pictures. The cartoon picture includes a talking face. A screen displays a plurality of messages. Each message corresponds to one of the plurality of second animated cartoon pictures thereof. A voice recognition unit which receives from a viewer a signal which corresponds to a selected message in the plurality of messages and a speech generator which electronically generates a voice signal including words in the selected message thereby simulating the viewer's side of a voice conversation. The video image generator generates picture elements of the second animated cartoon picture which corresponds to the selected message which is accompanied by a second voice signal which is responsive to the selected message and which thereby simulates a voice conversation between the viewer and the talking face in the animated cartoon movie.

U.S. Pat. No. 3,784,794, entitled Electro-optical Reader for Bar Codes or the Like, issued to David C. Allais on Jan. 8, 1974, teaches a bar-code, wand-type optical reader for entering bar code encoded data. Bar code is a technique of using printed media such as labels to store digital information wherein the information is typically represented by the width and the spaces between vertical bars printed black on a white background.

U.S. Pat. No. 4,239,151, entitled Method and Apparatus for Reducing the Number of Rejected Documents When Reading Bar Codes, issued to Mats A. Enser and Nils G. Stalberg on Dec. 16, 1980, teaches an apparatus for reading and decoding data encoded in terms of the spacing between the adjacent code bars on a document. The apparatus includes a reading element which produces an electrical pulse for each bar recorded on the document as the bar passes the reading element. A counter is used to measure the time between each two pulses and the resultant counts are stored in a memory in the order which the pulses were produced by the reading element. A microprocessor then compares this stored data with microcoded data which represents properly coded digits.

U.S. Pat. No. 4,086,476, entitled Control Circuit for a Code Reading Device, issued to Ronald J. King on Apr, 25, 1978, teaches an optical reader control system in which a detecting device is positioned upstream and downstream of an optical reader and generates the signals that control the operation of the optical reader in order to enforce the movement of a merchandise item past the optical reader within a predetermined path. A logic circuitry processes the signals of the detecting device in order to determine the occurence of a valid read operation by the optical reader.

U.S. Pat. No. 4,091,270, entitled Electronic Calculator with Optical Input Means, issued to Bernard E. Musch and Roy E. Martin on May 23, 1978, teaches a keyless electronic calculator which includes an optical bar code reader which enters bar-coded program information, in the form of data and individual commands, into the calculator. The calculator has a read-write memory unit which stores the entered information, a central processing unit which has a read-only memory unit with pre-stored routines for processing data by executing the entered commands or programs under control of the pre-stored routines, and a display unit for displaying the entered data and execution results. An alternative embodiment of the calculator includes both an optical input device and a keyboard. Programs, commands, and data values are printed in bar-code form on printed sheets. The user scans the appropriate data, commands and programs codes in order to enter the data and to enter and execute commands and programs.

U.S. Pat. No. 4,329,684, entitled Apparatus Using a Light Sensing System for Sensing Time Modulated Information from a Light Emitting Device, issued to George D. Monteath and Arthur H. Jones on May 11, 1982, teaches an electronic control and data transfer system for a television receiver which includes an electronic light emitting device and a modulator which selectively time modulates the light intensity at one or more selected regions of the light emitting device which may be a light pen. The electronic control and data transfer system also includes a manipulable electronic light sensor, which is selectively placed at a fixed position in front of one or more selected regions of the electronic light emitting device, and a detector, which is connected to the light sensor and which detects the time modulation in the sensor output to form a pulse train of time sequential code information which is identified with the time modulated light intensity of the selected region of the light emitting device.

When the light emitting device is a light pen it can be applied to selected portions of the screen of the television receiver. These selected portions are modulated at the field scan rate by data inputs such in successive television fields they are black or white in accordance with the values 1 or 0 of the bits of the data. The data can be used to pre-program the television receiver, or alternatively the data can be simply either stored or printed. The light pen can also be used to read bar codes in a broadcasting periodical. A low pass filter, a differentiator and an asymmetry detector sense whether the light pen output pulses have sharp or decaying trailing edges in order to distinguish whether the light pen is reading the cathode ray tube of the television receiver or a bar code. In an alternative arrangement the light pen can be used with a light emitting diode such as on either a radio receiver or a telephone.

SUMMARY OF THE INVENTION

In veiw of the foregoing factors and conditions which are characteristic of the prior art it is the primary object of the present invention to provide an interactive videodisc training system with bar code access for use in combination with a workbook having a printed index of training material which is stored on a videodisc.

It is another object of the present invention to provide an interactive videodisc training system for use in combination with a videodisc player which enables a trainee operator to use a printed index with associated bar codes in order to find training material which is stored on a videodisc in order to acquire specialized knowledge of a subject and learn skills by reading lessons and answering questions in the workbook and by viewing a video presentation of training the material which is interactively related to each area of the subject.

In accordance with the present invention an embodiment of the present invention an interactive videodisc training system with bar code access is described for use in combination with a videodisc on which training material is stored and a workbook having a printed index of the training material. A unique bar code is associated with each unique item in the printed index. The training system includes a bar code reading device for reading each unique bar code and a videodisc player for playing the training material which is stored on the videodisc. The videodisc player has a first microprocessor for receiving mode inputs and address inputs and a driving mechanism for rotatively driving the videodisc. The training system also includes a second microprocessor which is electrically coupled to the bar code reading device. The second microprocessor receives an input signal from the bar code reading device and processes the input signal in order to generate a set of output signals, which are the mode inputs and the address inputs. The first microprocessor, which is electrically coupled to the second microprocessor, controls the driving mechanism as the driving mechanism rotatively drives the videodisc to positions where the particular set of items are stored on the videodisc in order to access the unique set of items stored within the videodisc which corresponds to a particular associated bar code and retrieve the particular set of items in a particular sequence or pace.

The features of the present invention which are believed to be novel are set forth with particularity in the appended claims.

Other claims and many of the attendant advantages will be more readily appreciated as the same becomes better understood by reference to the following detailed description and considered in connection with the accompanying drawing in which like reference symbols designate like parts throughout the figures.

DESCRIPTION OF THE DRAWING

FIG. 2 is a schematic drawing of the interactive videodisc training system with bar code access of FIG. 1.

FIG. 3 is a perspective drawing of the printed index of FIG. 1 which has the printed index and a set of associated bar codes each of which corresponds to the unique set of items in the printed index.

DESCRIPTION OF THE PREFERRED EMBODIMENT

Figure 1:
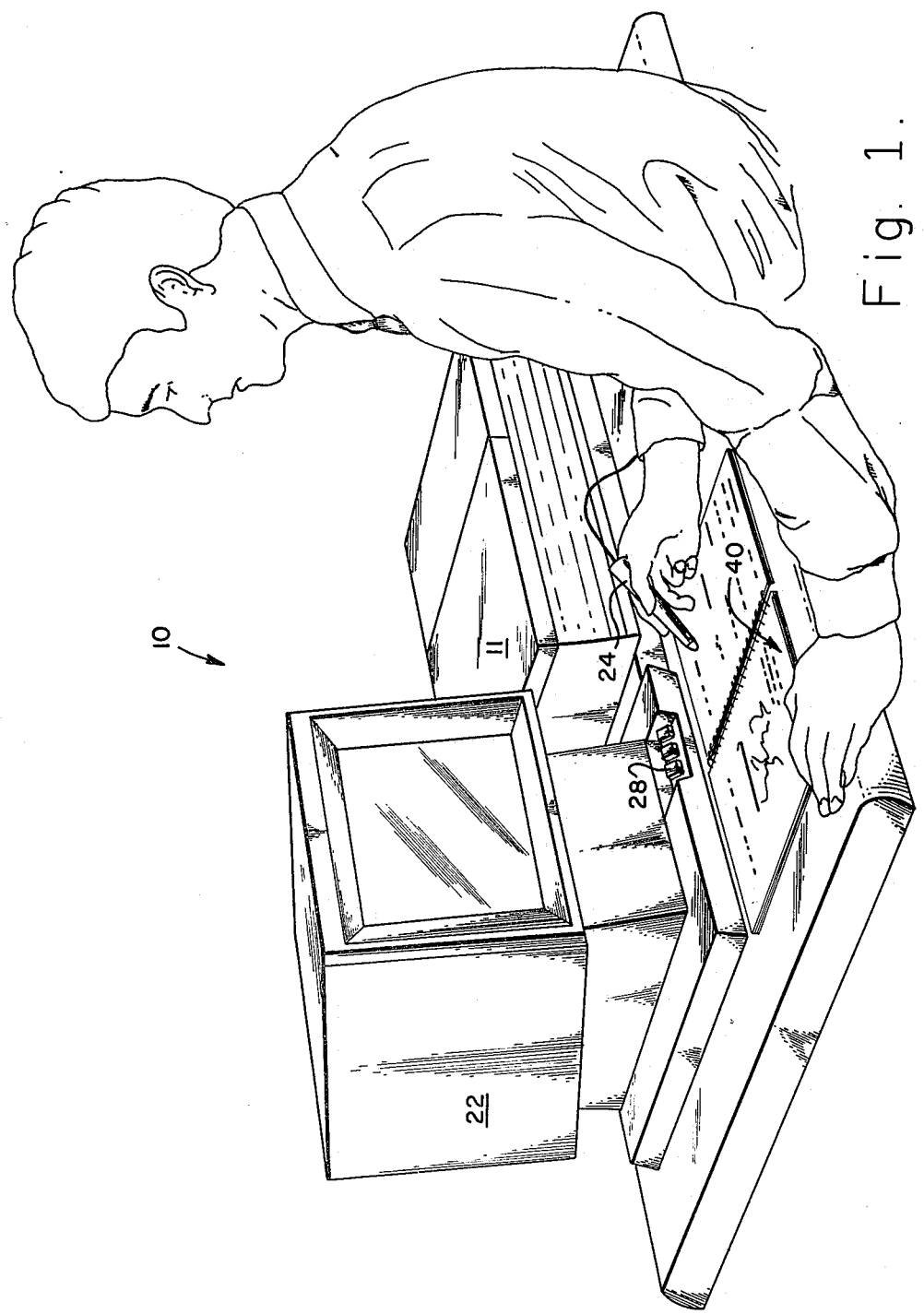
FIG. 1 is a perspective drawing of an interactive videodisc training system with bar code access which has been constructed in accordance with the principles of the present invention and which is for use in combination with a printed index in the form of a bound workbook which has a set of associated bar codes each of which corresponds to a unique set of items in the printed index and a videodisc system which includes a videodisc, a videodisc player, a video display apparatus, a printed index in the form of a bound workbook or manual, a manual control device and a bar code optical reader shown as the bar code optical reader is reading a set of associated bar codes each of which corresponds to a unique set of items in the printed index.

In order to best understand the present invention it is necessary to refer to the following description of its preferred embodiment in conjunction with the accompanying drawing. Referring to FIG. 1 an interactive videodisc training system 10 with bar code access for use in combination with a printed index which has a set of associated bar codes each of which corresponds to a unique set of items in the printed index. The interactive videodisc training system 10 with bar code access is electrically coupled to a videodisc player 11.

Referring to FIG. 2 in conjunction with FIG. 1 the videodisc player 11 includes a videodisc 12 and a disc drive 13 which rotatively drives the videodisc 12. The videodisc player 11 also includes a controller 14, which is electrically coupled to the disc drive 13 and which controls the disc drive 13, and an optical playing apparatus 15, which is optically coupled to the videodisc 12. The optical playing apparatus 15 includes a laser source 16 which is optically coupled to the videodisc 12 by means of a track/focus mechanism 17 and beam optics 18. The track/focus mechanism 17 focuses the laser beam which the laser source 16 generates onto the videodisc 12, and causes the laser beam to track the concentric bands of stored information which are located on the videodisc 12. The optical playing apparatus 15 also includes an input electronic circuit 19 for receiving data therein which is electrically coupled to the laser source 16 and which modulates the optical signal from laser source 16. The optical playing apparatus 15 further includes an optical detector 20 which is optically coupled to the videodisc 12 by means of the track/focus mechanism 17 and the beam optics 18. The optical detector 20 transduces the optical signal of the laser beam which is reflected back from the videodisc 12 in order to produce electrical signals corresponding to the information which is recorded on the videodisc 12. The optical playing apparatus 15 also includes an output electronic circuit 21, which is electrically coupled to the optical detector 20 and which demodulates the electrical signals from the optical detector 20 in order to produce television signals compatible with a video display apparatus 22, such as a television receiver or a television monitor. Each television picture, or frame, shown on the video display apparatus 22 is composed of the information stored on one concentric band of the videodisc 12.

The video controller 14 is electrically coupled to the track/focus mechanism 17, the input electronic circuit 20 and the output electronic circuit 21. The controller 14 includes a microprocessor which receives input data inputs for enabling the controller 14 to control the disc drive 13 and to thereby locate a specific frame or one of the concentric bands on the videodisc 12 wherein specific information is stored. The microprocessor of the controller 14 also receives data inputs for enabling the videodisc player 11 to retrieve information from the videodisc 12 in normal play, slow motion and fast scan, and in forward and reverse, by specifying the order and time interval in which the controller 14 accesses the individual concentric bands, or frames, on the videodisc 12. The controller 14 makes use of frame number encoding of the information on a videodisc 12. Within each videodisc band a coded digital word is placed and contains pseudorandom sync signals, parity check, a five decimal digit frame number and a field identification. The parity check and the pseudorandom sync signals are used to ensure that only valid data are used. The five digit display presents the number of the frame being viewed. When the search mode is initiated, the microprocessor of the controller 14 compares by logic the present frame number with the desired frame number. The disc drive 13 has a leadscrew servo which initiates a fast scan of the coded digital word until it passes the desired frame number at which time the videodisc player 11 resumes normal real-time play until the desired frame is reached.

In U.S. Pat. No. 4,199,820 a random access storage apparatus for use in a storage apparatus wherein signals are recorded on tracks which have addresses assigned in advance on a rotary recording medium such as an optical videodisc and which are randomly searched at high speed.

In U.S. Pat. No. 4,138,663 a videodisc stores items of information which are locatable by addresses previously recorded on each of the grooves which form a track for counting the number of grooves traversed. The optical reader includes a device for counting the number of grooves traversed during search phases.

Still referring to FIG. 2 the interactive videodisc training system 10 with bar code access 10 includes a microcontroller 23 which is electrically coupled to the microprocessor of the controller 14 and a bar code reader 24 which is electrically coupled to the microcontroller 23 and which reads each of the set of associated bar codes of the printed index. The microcontroller 23 operates on the data input from the bar code reader 24 and provides the mode inputs and address inputs for accessing the unique set of items of information stored on the videodisc 12 which correspond to a particular associated bar code.

Again referring to FIG. 2 the microcontroller 23 includes a bar code electronic circuit 25 which is electrically coupled to the bar code optical reader 24, a first input port and latch 26 which is electrically coupled to the bar code electronic circuit 25 and a microprocessor 27 which is electrically coupled to the first input port and latch 26. The interactive videodisc training system 10 with bar code access further includes a manual controller 28 and the microcontroller 23 also includes a manual controller electronic circuit 29 which is electrically coupled to the manual controller 28, a second input port and latch 30 which electrically couples the manual controller electronic circuit 29 to the microprocessor 27. The microcontroller 23 further includes a buffer 31 which electrically couples the status port of the controller 14 of the videodisc player 11 to the third input port and latch 32 which is electrically coupled to the microprocessor 27. A read only memory 33, an internal random access memory 34 and a timer 35 are electronically coupled to the microprocessor 27. The microcontroller 23 has a first port driver 36, which is electronically coupled to an external random access memory 37 which the microprocessor 27 uses as an electronic scratch pad, and a second port driver 38 which is electrically coupled to an output electronic circuit 39 which electrically couples the command port of the controller 14 of the videodisc player 11 to the microcontroller 23.

Referring now to FIG. 3 in conjunction with FIG. 1 the printed index is a bound workbook 40 which is a training manual for emergency care treatment and is open to pages 41 and 42 for lesson 1, entitled "Managing Critically Injured Patients." On page 41 after the first heading 43 which reads, "SCENE OF THE ACCIDENT," there is a first mode symbol 44 which is designated, "MOTION," and which has a first bar code 45 which is associated with the first mode symbol 44. There is also a second mode symbol 46, which is designated, "REVIEW," and which is adjacent to a review question 47, and which has a set of second bar codes 48, 48a and 48b each of which is adjacent to one of the possible answers 49, 49a and 49b to the review question 47. On page 42 after the second heading 50 which reads, "EVALUATION AND MANAGEMENT ROUTINES," there is a third mode symbol 51 which is designated, "CHOICE," and which is adjacent to a review menu 52 having routines which are related to a schematic drawing 53 of a man, and which has a set of third bar codes 54 each of which is adjacent to one of the routines on the review menu 52 so that an operator may selectively review the training material.

Through the use of bar codes the cost of index storage can be minimized and the difficulty of index searching can be significantly reduced. The purpose of the printed index is to store the information index on paper, which has better visual resolution than does television, and to use the usual English language information descriptors each of which descriptor has a bar code sequence of instructions for getting the information. The operator reads the bar code using the bar code reader 24 without learning a query language or a keying sequence. The operator is able to generate instructions which directly control storage medium through the microcontroller 23 which functions as a small, inexpensive bar code interface. The use of the bar code reader 24 eliminates errors in typing queries or keying number/letters. The bound workbook 40, which is formed out of paper, is not only inexpensive to store, but is also of a form which is familiar to the operators.

All videodisc players, both for commercial use and recreational use, require the operator to key in a complex, hard to learn sequence to find data with many opportunities for making an error or at least to go through a lengthy and cumbersome interactive tree-search procedure. Both types of videodisc players have remote control connections to which the bar code reader 24 and the microcontroller 23 can be connected to that interface. The index of information can be printed on paper with bar codes containing the commands for searching. In addition to being able to store the index in a book or a pamplet it is also possible to use more imaginative graphics. Such graphics may include either a map which can have bar codes over cities or states and scanning the bar codes can retrieve pictures and movies about those areas or an organizational chart for a company can have a bar code printed below the name of each division whereby scanning the bar code on the tree will retrieve graphic information about the division.

Such indexing for the videodisc player 11 does not depend on a special format for the videodisc 12. All of the currently available commercial videodisc player 11 can be so indexed. Another example is that of an exercise disc which has thirty exercises for men and women which are organized for daily and weekly regimens.

The interactive videodisc training system 10 with bar code access and the bound workbook 40 enables the operator to conveniently find information which is stored on the videodisc 12. The bar code numbers associated with each item in the bound workbook 40 may be encoded in accordance with an encryption formula so that only the microcontroller 23 is able to decode the encoded bar code number in order to prevent pirating of the information in the bound workbook 40 and to provide security for confidential information. The microcontroller 23 includes an encryption and decryption integrated circuit which has an algorithm for encoding and decoding the set of associated bar codes for the unique set of items and appropriate set of specified modes.

The bar code corresponding to an item or set of items in the printed index contains data regarding the location of information stored on the videodisc 12 and associated with that item or set of items and individiual commands which determine how that information will be presented. When the bar code associated with an item in the printed index is entered into the interactive videodisc training system 10 the interactive videodisc training system 10 automatically selects and presents the information associated with that item from the videodisc player 11.

The data in a single bar code may also initiate a sequence of information selections. This sequence may have one or several branch points at which the user selects among a number of available choices using the manual controller 28 or other selection means and the information subsequently retrieved from the videodisc 12 depends on the choice made by the user.

The printed index with which the bar codes are associated may be a list of items arranged alphabetically or by another method. The printed index may also be a collection of instructions or of materials to be learned, as in a repair manual, a textbook or a training workbook. The printed index may also be a graphical representation of items, as in a map or schematic drawing. Additionally, the printed index may be formed by the collection of the indexed items themselves, as when a bar code is printed on each or a set of books, machine parts, or other products or components.

From the foregoing it can be seen that an interactive videodisc training system with bar code access for use in combination with a printed index which has a set of associated bar codes each of which corresponds to a unique set of items in the printed index system has been described. It should be noted that the sketches are not drawn to scale and that distance of and between the figures are not to be considered significant. It should also be noted that the interactive videodisc training system may also be referred to as an interactive system for training and/or instruction.

Accordingly it is intended that the foregoing disclosure and showing made in the drawing shall be considered only as an illustration of the principles of the present invention.

What is claimed is:

1. An interactive training system with bar code access comprising a printed schematic representation having a printed index which has a set of associated bar codes each of which corresponds to a portion of the schematic and a unique set of items in the printed index related to said portion and further comprising:
   a. bar code reading means for reading each of the set of associated bar codes of the printed index;
   b. a videodisc player which stores information on a videodisc and which has a driving mechanism, which rotatively drives said videodisc, and a first microprocessor, which receives mode inputs and address inputs; and
   c. a second microprocessor which is electrically coupled to said bar code reading means from which said second microprocessor receives an input signal whereby said second microprocessor processes said input signal and generates a set of output signals, which are said mode inputs and said address inputs, wherein said second microprocessor is electrically coupled to said first microprocessor of said videodisc player so that said first microprocessor controls said driving mechanism as said driving mechanism rotatively drives said videodisc to positions where the particular set of items are stored on said videodisc in order to access the unique set of items stored within said videodisc which corresponds to a particular associated bar code and retrieve the particular set of items in a particular sequence or pace, said second microprocessor being also electrically coupled to said bar code reading means.

2. An interactive instruction system with bar code access comprising a textbook or workbook having a schematic and a printed index which has a set of associated bar codes each of which corresponds to a portion of the schematic and a unique set of items in the printed index related to said portion and further comprising:
   a. bar code reading means for reading each of the set of associated bar codes of the printed index;
   b. a videodisc player which stores information on a videodisc and which has a driving mechanism, which rotatively drives said videodisc, and a first microprocessor, which receives mode inputs and address inputs; and
   c. a second microprocessor which is electrically coupled to said bar code reading means from which said second microprocessor receives an input signal whereby said second microprocessor processes said input signal and generates a set of output signals, which are said mode inputs and said address inputs, wherein said second microprocessor is electrically coupled to said first microprocessor of said videodisc player so that said first microprocessor controls said driving mechanism as said driving mechanism rotatively drives said videodisc to positions where the particular set of items are stored on said videodisc in order to access the unique set of items stored within said videodisc which corresponds to a particular associated bar code and retrieve the particular set of items in a particular sequence or pace, said second microprocessor being also electrically coupled to said bar code reading means.

3. An interactive training system with bar code access according to claim 1 wherein the schematic representation is a picture of parts of a machine or a list of the parts of the machine each of which is designated by name and each of which has a unique bar code associated with the name of each part of the machine whereby an operator may use said bar code reading means to retrieve information regarding a particular part of the machine.

4. An interactive training system with bar code access according to claim 1 wherein the schematic representation is a workbook by which a trainee is able to acquire specialized knowledge and learn skills by reading the lessons and answering the questions in the workbook on a subject and by viewing a video presentation of material which is interactively related to each area of the subject of the workbook wherein a unique bar code is associated with each area of the subject whereby an operator may use said bar code reading means to retrieve pictures and other information regarding a particular area of the subject.

* * * * *